United States Patent
Pichot et al.

(10) Patent No.: US 7,730,786 B2
(45) Date of Patent: Jun. 8, 2010

(54) SEISMIC SENSOR PROVIDING A BODY AND AN INSERTION TIP HAVING AT LEAST TWO WINGS BETWEEN WHICH CAVITIES EXTEND, AND CORRESPONDING INSERTION TIP

(75) Inventors: Yann Pichot, Orvault (FR); Christian Grégoire, La Chapelle sur Erdre (FR)

(73) Assignee: Sercel, Carquefou (FR)

( * ) Notice: Subject to any disclaimer, the term of this patent is extended or adjusted under 35 U.S.C. 154(b) by 0 days.

(21) Appl. No.: 12/141,533

(22) Filed: Jun. 18, 2008

(65) Prior Publication Data
US 2009/0007673 A1 Jan. 8, 2009

(30) Foreign Application Priority Data
Jul. 4, 2007 (FR) .................................. 07 04819

(51) Int. Cl.
*G01H 11/00* (2006.01)
(52) U.S. Cl. .......................................... 73/649; 73/584
(58) Field of Classification Search .................. 73/584, 73/649, 661; 367/178
See application file for complete search history.

(56) References Cited
U.S. PATENT DOCUMENTS

| | | | | |
|---|---|---|---|---|
| 1,951,358 A * | 3/1934 | Hayes | .......................... | 367/185 |
| 3,806,908 A * | 4/1974 | Bound et al. | ................. | 340/525 |
| 3,930,218 A * | 12/1975 | Hall, Jr. | ...................... | 367/188 |
| 5,010,531 A * | 4/1991 | McNeel | ...................... | 367/188 |
| 7,013,745 B2 * | 3/2006 | Kolarczyk et al. | .......... | 73/866.5 |
| 7,057,974 B2 * | 6/2006 | Pakhomov et al. | .......... | 367/178 |
| 7,122,783 B1 * | 10/2006 | Pastore et al. | ........... | 250/227.14 |
| 2004/0053647 A1 * | 3/2004 | Pakhomov et al. | ....... | 455/569.1 |
| 2006/0077757 A1 * | 4/2006 | Cox et al. | ...................... | 367/25 |
| 2006/0213290 A1 * | 9/2006 | Kolarczyk et al. | .......... | 73/866.5 |

FOREIGN PATENT DOCUMENTS
WO WO 96/10195 4/1996

OTHER PUBLICATIONS
French Search Report, Dec. 14, 2007, 2 pages.
* cited by examiner

*Primary Examiner*—Hezron Williams
*Assistant Examiner*—Samir M Shah
(74) *Attorney, Agent, or Firm*—Pauly, Devries, Smith & Deffner, L.L.C.

(57) ABSTRACT

A seismic sensor, having a body which incorporates means for detecting and/or measuring waves, and, in the extension of said body, a tip for insertion into the ground, said tip extending between an upper end and a lower end, wherein said tip has at least two wings which together give said tip a V-shaped profile, said wings having between them at least one cavity which extends from said upper end to close to said lower end.

11 Claims, 2 Drawing Sheets

Fig. 6   Section B-B   Section A-A

SEISMIC SENSOR PROVIDING A BODY AND AN INSERTION TIP HAVING AT LEAST TWO WINGS BETWEEN WHICH CAVITIES EXTEND, AND CORRESPONDING INSERTION TIP

CROSS-REFERENCE TO RELATED APPLICATIONS

This application claims the benefit of French Patent Application No. FR 07/04819, filed on Jul. 4, 2007, which application is hereby incorporated by reference in its entirety.

BACKGROUND OF THE INVENTION

1. Field of the Invention

The field of the invention is that of seismic data acquisition. More specifically, the invention relates to the design of the insertion tips with which seismic sensors are provided, in order to allow them to be installed and/or held in the ground.

The invention relates in particular to the industry of oil prospecting using the seismic method in a land-based environment, but may be applied to any field which uses a seismic data acquisition network.

2. Background of the Invention

The operations of acquiring seismic data on land conventionally use networks of electronic control units to which there are connected sensors for detecting movements of the ground. Sensors of this type, known as geophones, are generally interconnected as a group of sensors via cables so as to form clusters known as "strings". One or more of these strings are connected to said electronic control unit. The electronic control units, interconnected to one another by a wired digital network, or via a radio network, carry out the analogue/digital conversion of the signal from the groups of sensors and transmit these data to the recording truck via said digital network.

The lower face of the sensors is equipped with means for mechanical coupling to the ground. Depending on the nature of the land and/or the type of sensor, these mechanical coupling means may be a tip or a foot which is designed to be inserted into the ground.

In the case of tips, work has been carried out on the design thereof, and in particular on the length thereof, and it has been found that the longer the tip, the easier it is to insert it into the ground (knowing that these are traditionally pushed in by an operator's foot).

In parallel, new systems have recently been brought onto the market in which the sensors are annexed to the electronic conversion unit, which has the effect of eliminating the strings used with the geophones.

Sensors of this type are generally known as "digital sensors".

According to one or the other of the sensor techniques, in order to gather the geophysical data, one or more seismic sources in contact with the ground are activated so as to propagate omnidirectional seismic wave trains. The sources may include explosives, weight drops or vibrating devices.

The wave trains reflected by the layers of the ground are detected by the sensors, which generate a signal characteristic of the reflection of the waves at the geological interfaces below ground.

It will therefore be understood that one important parameter for the precision of the geophysical data gathered is the coupling of the sensors to the ground, and more specifically the coupling of the tip to the ground.

SUMMARY OF THE INVENTION

The object of the invention is in particular to overcome the disadvantages of the prior art.

More specifically, the object of the invention is to propose a seismic sensor having an insertion tip which makes it possible to improve ease of insertion and/or the quality of coupling of the seismic sensor to the ground.

To this end, one object of the invention is to provide such a seismic sensor having a tip which allows a better quality of contact with the ground compared to the solutions of the prior art.

Another object of the invention is to provide such a seismic sensor having a tip which offers greater resistance to withdrawal than the solutions known from the prior art.

Another object of the invention is to provide such a seismic sensor having a tip which ensures a high degree of stability of the seismic sensor in the ground.

Another object of the invention is to provide such a seismic sensor having a tip of simple design which is easy to use and inexpensive to produce.

These objects, as well as others which will become apparent below, are achieved by the invention which relates to a seismic sensor, of the type having a body which incorporates means for detecting and/or measuring waves, and, in the extension of said body, a tip for insertion into the ground, said tip extending between an upper end and a lower end, characterised in that said tip has at least two wings which together give said tip a V-shaped profile, said wings having between them at least one cavity which extends from said upper end to close to said lower end.

Thus, an insertion tip according to the invention has many advantages, including:
- the wings of the tip which give the latter a V-shaped profile are elements which protrude in such a way as to aid insertion of the tip into the ground; and
- the cavities between the wings tend to:
  - limit the force resistant to insertion;
  - increase the contact surface area between the tip and the ground and consequently increase the friction between the tip and the ground, which helps to generate a force resistant to withdrawal of the seismic sensor.

It will be understood that, since the coupling is directly dependent on the surface area of the tip in contact with the ground, increasing the surface area of the tip in contact with the ground optimises the coupling of the sensor. The length of the tip combined with the lateral stiffeners formed by the wings therefore helps to improve the coupling.

Furthermore, a tip according to the invention also helps to improve the stability of the seismic sensor in the ground, in particular by locking the sensor against rotation by virtue of creating a resistive force tangential to the radius of the tip due to the presence of the wings.

This proves to be all the more beneficial in the case of digital sensors which conventionally incorporate means for detecting bidirectional or even three-dimensional waves. In this case, it is therefore particularly important to maintain the orientation of the sensors in the ground.

It will be noted that, with regard to digital sensors, it is now possible by virtue of the invention to insert these sensors without it being necessary to form a pilot hole.

It will also be noted that it is entirely possible with a tip according to the invention to give it a height which makes it possible to improve the drop strength of seismic sensors, and in particular of digital sensors which are relatively fragile.

According to one advantageous solution, said wings include means for retaining said tip in the ground, these retaining means preferably taking the form of a widening of said wings in the direction of said lower end.

In this way, the ability of the seismic sensor to be kept in the ground, and thus to withstand withdrawal forces, is considerably improved.

This is because the widening of the wings in the direction of the lower end of the tip tends to oppose the ground with a vertical component directly opposed to withdrawal, due to the presence of negative tapers on the wings, the thickness of which is greater at the base of the tip than at the top of the tip.

The coupling of such a seismic sensor to the ground therefore proves to be considerably increased compared to the solutions of the prior art.

Advantageously, said wings have a width which increases from said upper end to close to said lower end.

The tendency is thus to oppose the withdrawal of the sensor with a vertical component being exerted on the ground, in a manner distributed over the entire height of the tip or almost the entire height thereof.

According to a first embodiment, the seismic sensor has two wings, for example, located diametrically opposite one another.

According to a second embodiment, the seismic sensor has three wings, for example, spaced equidistantly or spaced apart by 120°.

According to a third embodiment, the seismic sensor has four wings, for example, spaced equidistantly or spaced apart by 90°.

According to another advantageous feature of the invention, said cavities have a cross section which is curved from one wing to the other.

Thus, after insertion of the sensor, the ground tends, as a result of its elasticity, to be pressed against the entire curved surface of the cavities.

According to yet another feature of the invention, said body has a frustoconical base end, said wings forming between them a V with an angle substantially equal to that of the frustrum of said frustoconical base end.

The tip is therefore inscribed in a cone directly in the continuation of the frustoconical base of the body of the sensor, aiding insertion of the sensor not only over the entire height of the tip but also over a lower part of the body of the sensor.

The invention also relates to an insertion tip designed to be attached to a seismic sensor, characterised in that it has at least two wings which together give said tip a V-shaped profile, said wings having between them at least one cavity which extends from an upper end of said tip to close to a lower end of said tip.

BRIEF DESCRIPTION OF THE FIGURES

FIG. 6 is a view from below of an insertion tip according to the invention.

DETAILED DESCRIPTION

Figure 1:
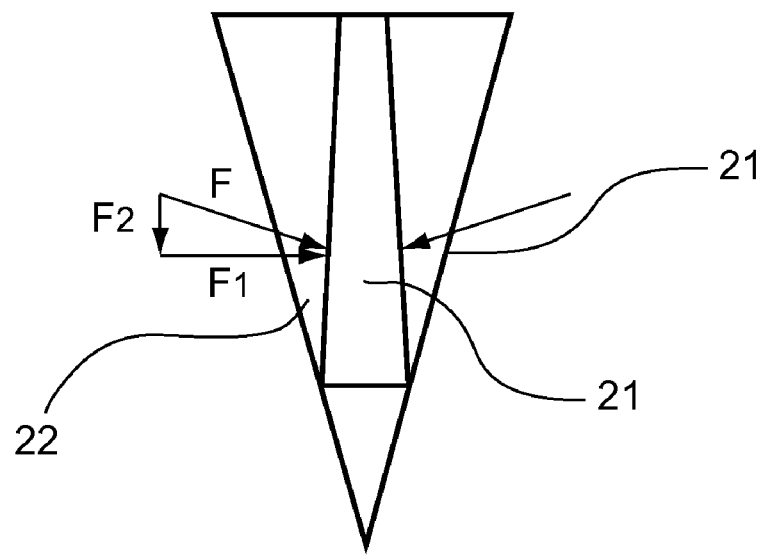
FIG. 1 is a schematic representation of a seismic sensor tip according to the invention.

In general, when designing insertion tips, the aim is to achieve a double objective: the ease of installation and the quality of the coupling.

The insertion of the sensor and the stability of the coupling are defined by resistive forces generated by the tip on the ground.

Thus, in order to facilitate insertion, it is necessary to limit the penetration force and to create "open" zones of the ground making it possible to enlarge the hole by locally packing down the ground.

Limiting the insertion force thus comes down to reducing the resistive penetration forces. These forces are normal to the outer surface of the tip. In order to reduce them, it is necessary to minimise the vertical component of these forces, which directly oppose the insertion force.

For its part, the quality (stability) of the coupling is characterised by the ability of the seismic sensor to maintain its inserted state and its orientation, despite any disturbances acting on the terrain, such as the wind, the traction of the cable to which the sensor is possibly connected, the passage of vehicles close to the sensor, etc.

The quality of the coupling is based on a principle similar to that mentioned above for the ease of insertion of the sensor (but applied inversely). This is because, in order to maintain its inserted state, it is necessary to maximise the resistive withdrawal force. This force comes from two sources:

friction of the ground against the tip;

vertical components opposed to withdrawal.

In the case of geophones, as mentioned above, the tendency is to increase the length of the tip and to give the latter a very tapered profile, with a view to limiting to the greatest possible extent the resistive penetration forces.

In this way, a tip is obtained which can be easily inserted in the ground, without any force on the part of the operator installing the network of sensors.

On the other hand, it has been found that these tips are subject to vibrations and may even, for certain lengths of tip, enter into resonance.

Of course, these vibrations are parasitic data which are detrimental to the quality of the geophysical data gathered.

In the case of digital sensors, these have a foot which is to be pushed in and which has dimensions (both in terms of height and diameter) much greater than those of the tips of geophones, in particular due to the fact of incorporating in the sensor a greater number of components than in the case of geophones.

In practice, a relative fragility of digital sensors in the event of impacts (for example if the sensor is dropped) being exerted on the foot of the sensor is undesirable.

Furthermore, the dimensions of these digital sensors are such that they make it necessary for the operators installing them in the ground to form a pilot hole before inserting the sensor in the ground.

Of course, this operation which includes drilling pilot holes tends to increase the duration of the phase of installing the network of sensors, which consequently also tends to increase the cost thereof.

Furthermore, the drilling of a pilot hole before inserting the sensor renders uncertain the coupling of the sensor to the ground.

The reason for this is that several phenomena may impair the coupling of the sensor to the ground, including:

the density of the ground is locally modified as a result of the drilling process, which tends to loosen the ground around the sensor and cause an instability of the latter in the ground;

the pilot hole is formed with a greater or lesser degree of care on the part of the operator and/or at a greater or lesser speed, the pilot hole formed possibly having as a result a variable height and/or diameter, or even a frustoconical shape, to the point of obtaining a pilot hole having a shape which is unsuitable for an effective coupling of the sensor to the ground.

Furthermore, regardless of whether geophones or digital sensors are involved, insertion feet generally offer low resistance to withdrawal, which may lead to situations which hinder good geophysical data acquisition, or may even require inspection rounds in order to reinsert into the ground where necessary any seismic sensors that have been "withdrawn".

As mentioned above, the principle of the invention lies in the fact of equipping a seismic sensor with a tip having V-shaped wings and cavities extending substantially from the bottom to the top of the tip between the wings. Other features and advantages of the invention will become more clearly apparent on reading the following description of a preferred embodiment of the invention, given by way of non-limiting example, and the appended drawings.

Figure 2:
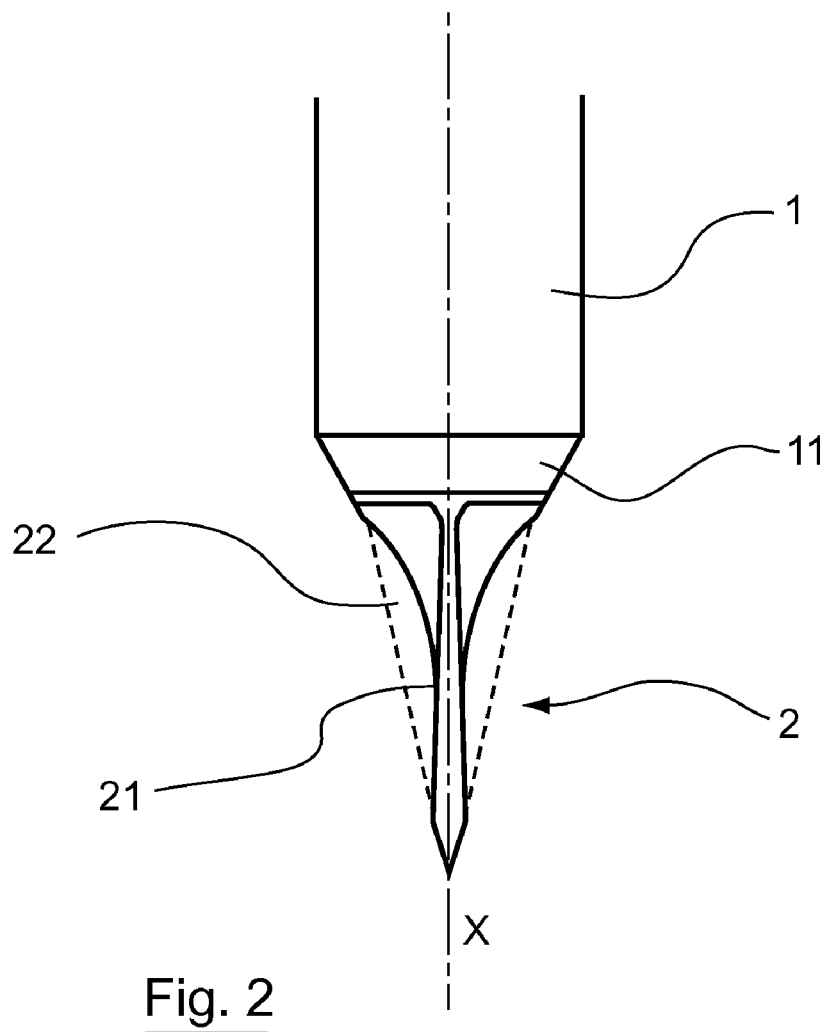
FIG. 2 is a side view of a seismic sensor equipped with a tip according to the invention.

With reference to FIG. 2, a seismic sensor includes a body 1 which incorporates means for detecting and/or measuring waves, and also an insertion tip 2 which extends in the continuation of the body 1, at the base thereof.

It will be noted that the invention applies both to geophones and to so-called digital sensors.

In the case of geophones, the body of the sensor incorporates a means for detecting unidirectional waves, the body of the sensor being connected by a wired digital network to an electronic control unit which is itself connected to other geophones.

In the case of digital sensors, the body of the sensor incorporates a plurality of components for detecting waves, each dedicated to detecting one particular wave orientation, the body also incorporating an analogue/digital converter, perhaps even a transmitter and a battery for autonomous power supply.

According to the principle of the invention, the coupling tip of the seismic sensor includes at least two wings 21 which together give the tip a V-shaped profile (as can clearly be seen in FIGS. 1, 2, 3 and 8) and cavities 22, each of these cavities extending between the wings 21, from the upper end to the lower end (or almost) of the tip.

It will be noted that the number of wings may vary depending on requirements (in particular depending on the nature of the ground in which the tip is intended to be inserted).

Thus, a seismic sensor according to the invention may have, according to different embodiments:

two wings 21 located diametrically opposite one another;
three wings 21 spaced apart by 120° about the axis of revolution of the tip;
four wings spaced apart by 90° about the axis of revolution X of the tip (case of the present embodiment).

According to another advantageous feature of the invention, the wings 21 have a widening in the direction of their lower end, this widening increasing in the present embodiment from the upper end to the lower end of the tip.

In this way, as can be seen in FIG. 1, the wings oppose the ground with a resistive force F in an orthogonal direction of their radial surface, this force F being broken down into a horizontal component F1 and a vertical component F2, the latter opposing withdrawal (removal) of the tip from the ground.

Such a widening of the wings therefore constitutes means for retaining the tip in the ground.

Figures 3, 4, 5:
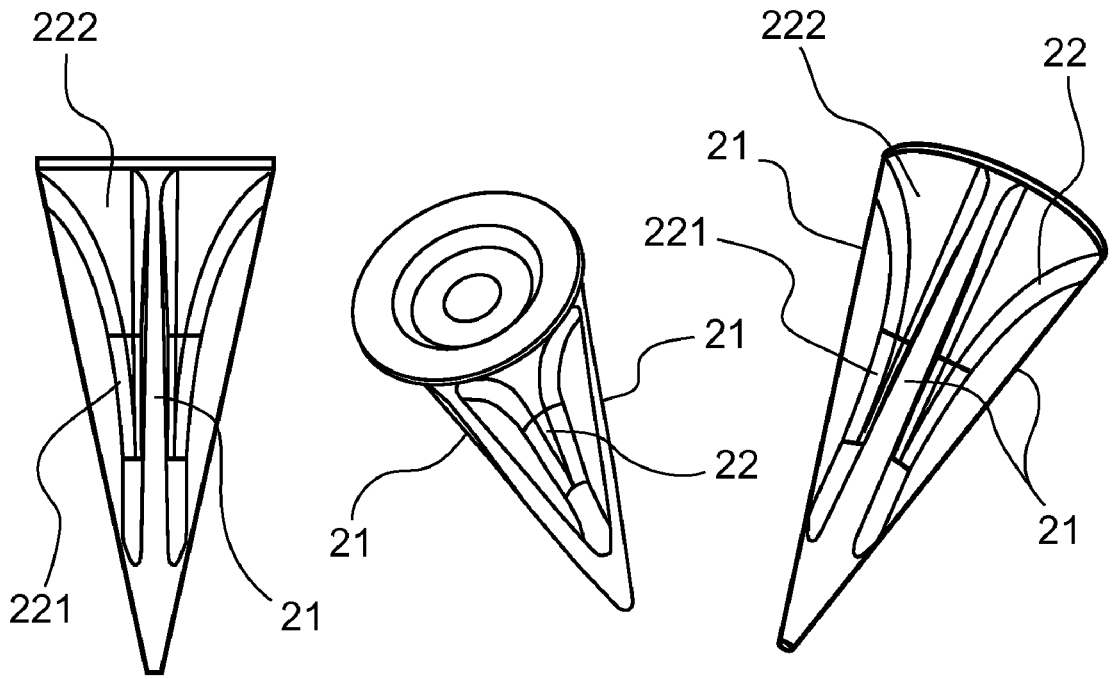
FIG. 3 is a side view of an insertion tip according to the invention.
FIGS. 4 and 5 are two perspective views of an insertion tip according to the invention.

Furthermore, it will be noted with reference to FIGS. 4 and 6 that the cavities 22 have a cross section which is curved from one wing to the other.

More specifically, the cavities 22 have a first portion 221 which extends from the lower end of the tip, which meets a second portion 222 which widens in the direction of the upper end of the tip.

This second portion 222 performs a dual function:
a function of rigidity of the tip;
a function of connecting the wings to the upper end of the tip.

Furthermore, according to the present embodiment, the body 1 of the seismic sensor has at its base a frustoconical portion 11 (FIG. 2).

Figures 7, 8:
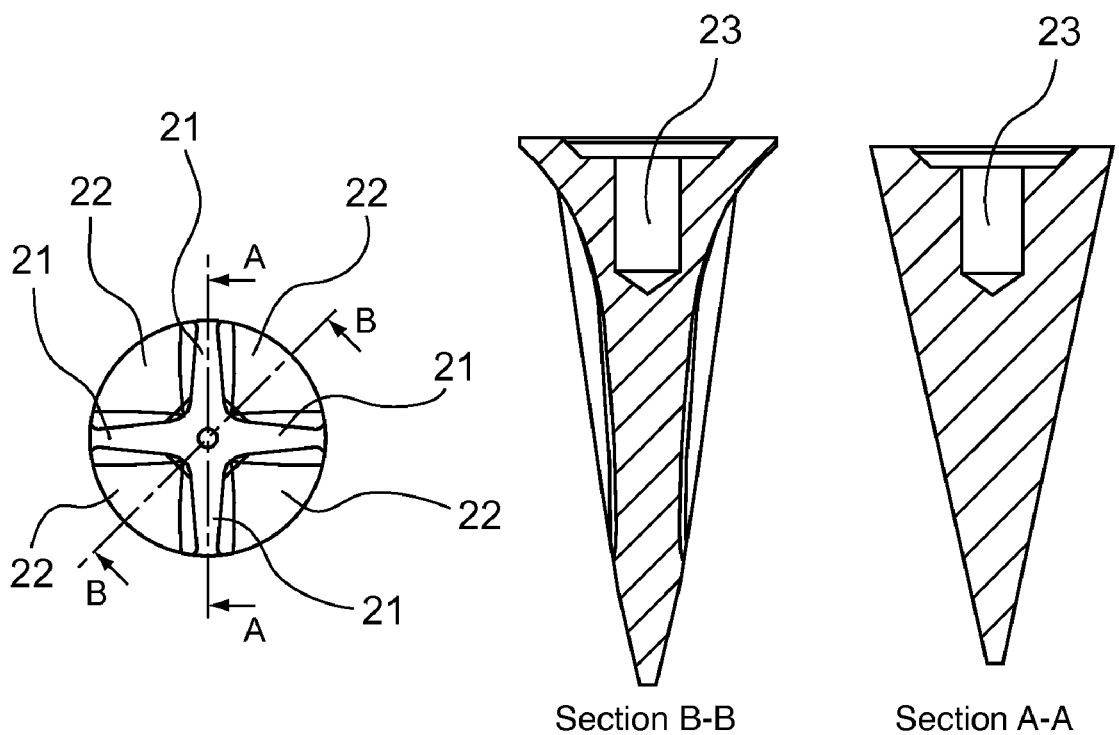
FIG. 7 is a view of an insertion tip according to the invention, along the section BB marked on FIG. 6.
FIG. 8 is a view of an insertion tip according to the invention, along the section AA marked on FIG. 6.

In parallel, considering that the edge of the wings 21 forms a generatrix of a cone of revolution within which the tip is inscribed (as can be seen in FIG. 8), the angle of this cone of revolution within which the tip is inscribed is equal (or at the very least close) to that of the frustrum 11 at the base of the body 1.

With reference to FIGS. 7 and 8, the tip incorporates in its upper part a threaded bore 23 which allows it to be secured by a screw to the body of the sensor.

A seismic sensor insertion tip as has just been described will preferably be obtained by a founding process, and could also be obtained by moulding or even by machining.

What is claimed is:

1. A seismic sensor for detecting ground movement, said seismic sensor comprising:
   a body which incorporates means selected from the group consisting of means for detecting waves, means for measuring waves, and combinations thereof, and,
   a body extension having a tip for insertion into the ground, said tip extending between an upper end and a lower end, wherein said tip has at least two wings which together give said tip a V-shaped profile, said wings having between them at least one cavity which extends from said upper end to close to said lower end, said wings comprising retaining means for retaining said tip in the ground, said retaining means comprising a widening of said wings in a direction of said lower end.

2. The seismic sensor according to claim 1, wherein said wings have a width which increases from said upper end to close to said lower end.

3. The seismic sensor according to claim 1, comprising two wings.

4. The seismic sensor according to claim 3, wherein said wings are located diametrically opposite one another.

5. The seismic sensor according to claim 1, comprising three wings.

6. The seismic sensor according to claim 5, wherein said wings are spaced apart by 120°.

7. The seismic sensor according to claim 1, comprising four wings.

8. The seismic sensor according to claim 7, wherein said wings are spaced apart by 90°.

9. The seismic sensor according to claim 1, wherein said at least one cavity has a cross section which is curved from one wing to another.

10. The seismic sensor according to claim 1, wherein said body has a frustoconical base end having a frustrum, said wings form between them a V with an angle substantially equal to that of the frustrum of said frustoconical base end.

11. An insertion tip designed to be attached to a seismic sensor, comprising at least two wings which together give said tip a V-shaped profile, said wings having between them at least one cavity which extends from an upper end of said tip to close to a lower end of said tip, said wings comprising retaining means for retaining said tip in the ground, said retaining means comprising a widening of said wings in a direction of said lower end.

* * * * *